Figure 1:
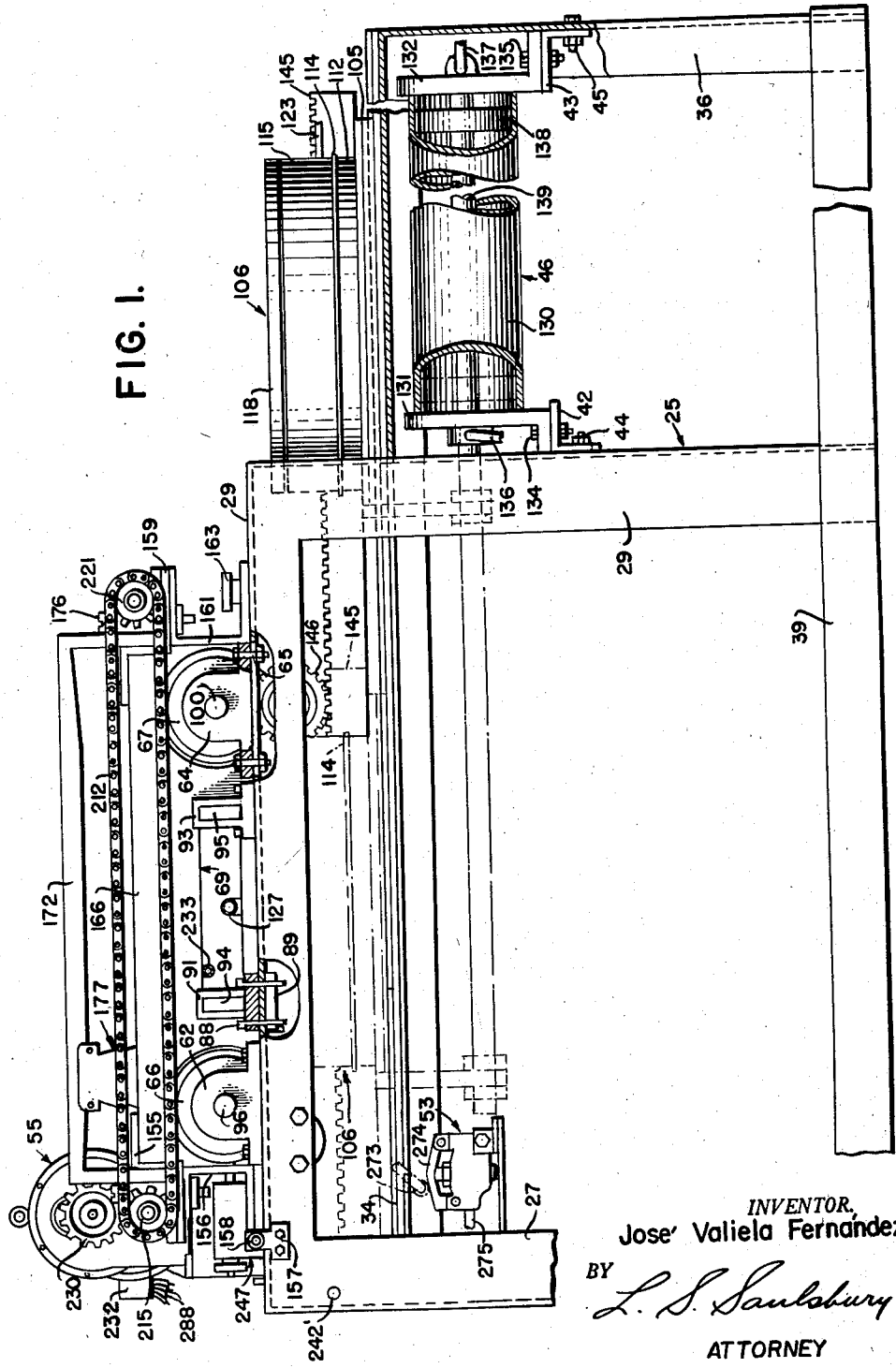

July 29, 1958  J. V. FERNÁNDEZ  2,845,020
AUTOMATIC SILK SCREEN CERAMIC PRINTING MACHINE
Filed Dec. 31, 1956  9 Sheets-Sheet 1

INVENTOR.
José Valiela Fernández
BY
L. S. Saulsbury
ATTORNEY

July 29, 1958 J. V. FERNÁNDEZ 2,845,020
AUTOMATIC SILK SCREEN CERAMIC PRINTING MACHINE
Filed Dec. 31, 1956 9 Sheets-Sheet 2

INVENTOR.
José Valiela Fernández
BY
*L. S. Saulsbury*
ATTORNEY

July 29, 1958 J. V. FERNÁNDEZ 2,845,020
AUTOMATIC SILK SCREEN CERAMIC PRINTING MACHINE
Filed Dec. 31, 1956 9 Sheets-Sheet 3

INVENTOR.
José Valiela Fernández
BY
ATTORNEY

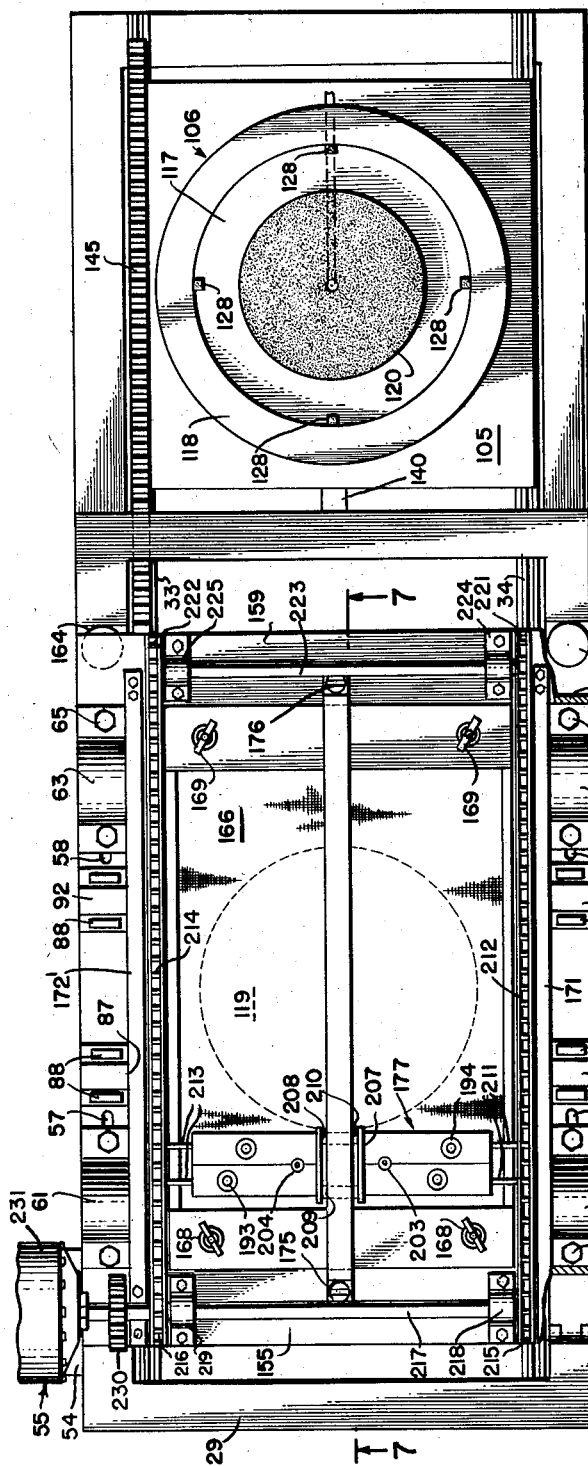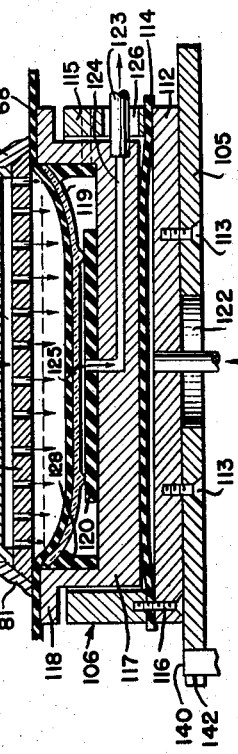

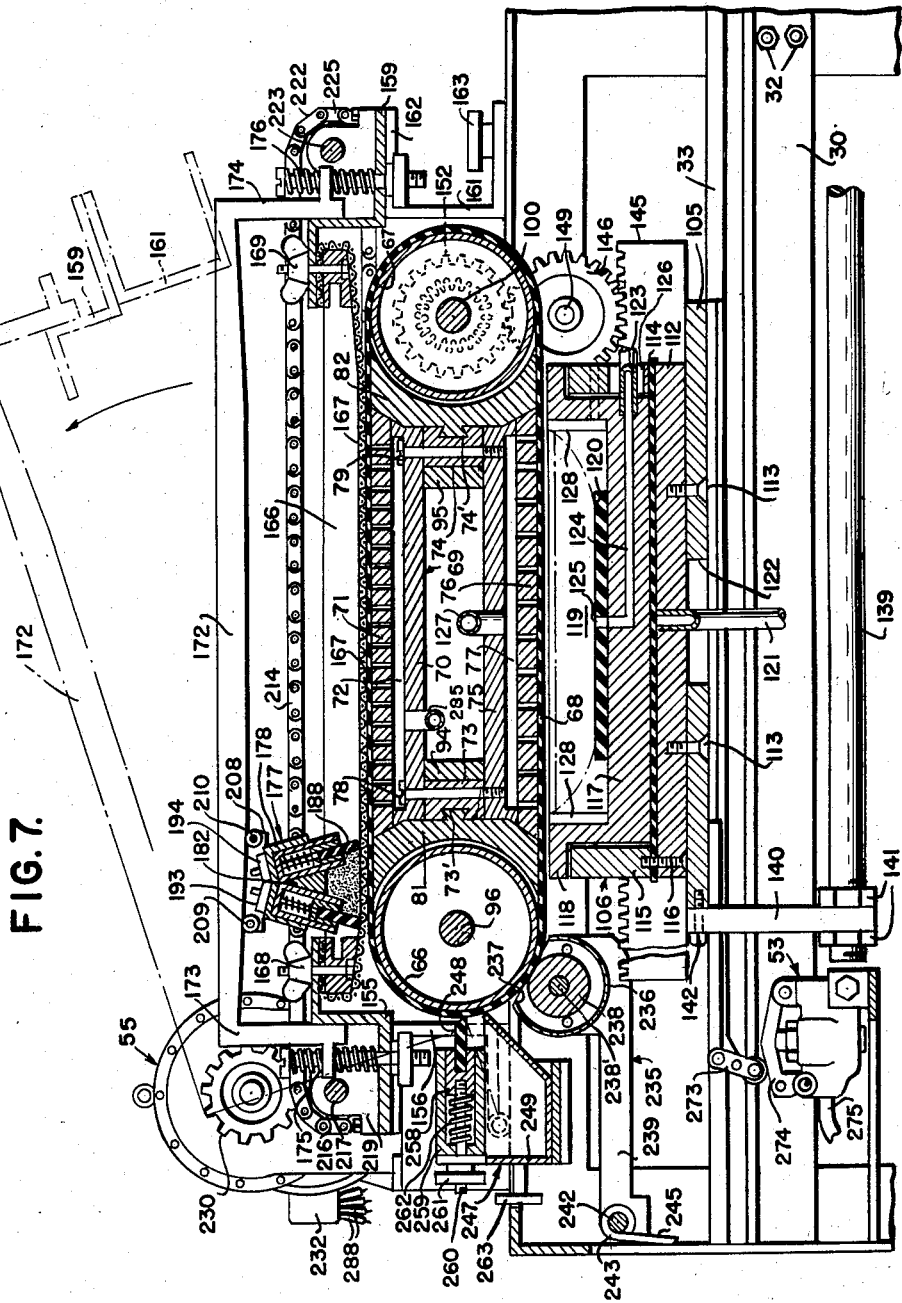

July 29, 1958 J. V. FERNÁNDEZ 2,845,020
AUTOMATIC SILK SCREEN CERAMIC PRINTING MACHINE
Filed Dec. 31, 1956 9 Sheets-Sheet 6

INVENTOR.
José Valiela Fernández
BY
*L. S. Saulsbury*
ATTORNEY

July 29, 1958   J. V. FERNÁNDEZ   2,845,020
AUTOMATIC SILK SCREEN CERAMIC PRINTING MACHINE
Filed Dec. 31, 1956   9 Sheets-Sheet 7

INVENTOR.
José Valiela Fernández
BY
L. S. Saulsbury
ATTORNEY

July 29, 1958 J. V. FERNÁNDEZ 2,845,020
AUTOMATIC SILK SCREEN CERAMIC PRINTING MACHINE
Filed Dec. 31, 1956 9 Sheets-Sheet 8

INVENTOR.
José Valiela Fernández
BY
L. S. Saulsbury
ATTORNEY

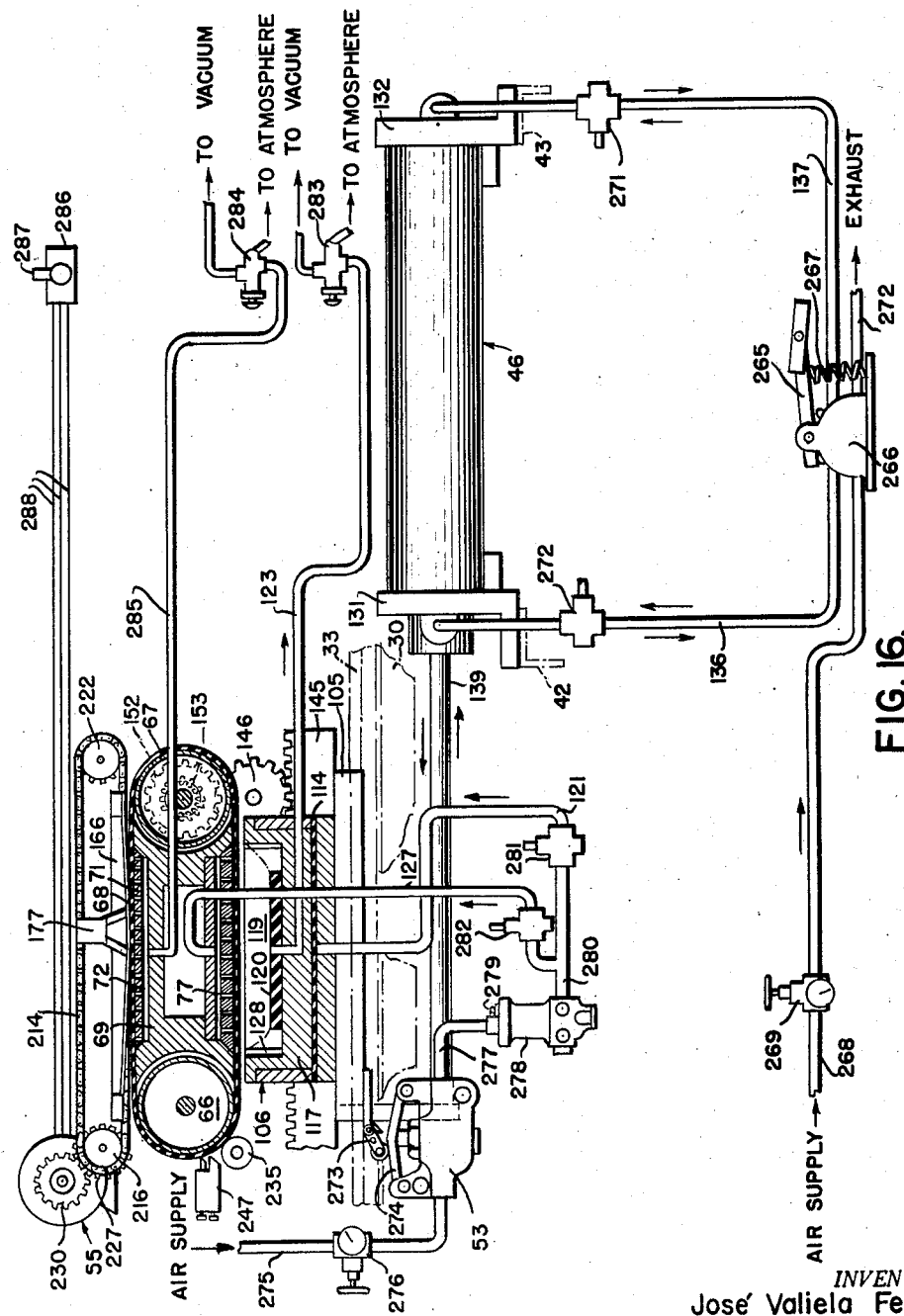

United States Patent Office 2,845,020
Patented July 29, 1958

2,845,020

AUTOMATIC SILK SCREEN CERAMIC PRINTING MACHINE

José Valiela Fernández, East Liverpool, Ohio

Application December 31, 1956, Serial No. 631,717

17 Claims. (Cl. 101—126)

This invention relates to an automatic silk-screen ceramic printing machine and more particularly to a machine for decorating ceramic articles including dishes and the like that have concave and convex surfaces.

It is the principal object of the present invention to provide a machine for silk-screen printing the concave and convex surfaces of ceramic articles wherein the squeegee used with the silk screen, the positioning of the ceramic article, the printing of the ornamentation upon the flexible transfer membrane, the movement of the flexible membrane to its transfer position over the article, the printing of the article with the membrane and the cleaning of the flexible membrane for another impression is all done automatically by merely inserting the article in the machine and putting the machine into operation.

It is another object of the invention to a squeegee device for forcing ink or pigment material through a silk screen that confines the ink or pigment to the area under the squeegee as it is passed over the surface of the silk screen and keeps the same from building up along the outside edges and ends of the squeegee wiping elements.

It is still another object of the invention to provide a squeegee for silk-screen printing operations that is power operated and adapted for use in automatic silk-screen printing machines.

It is a further object of the invention to provide for use with an automatic silk-screen ceramic printing machine, a flexible ink transfer member that can be moved in one direction through two stations, one station where the impression is made upon the member by the silk screen and at the other station where the impression is transferred to the ceramic article and in association therewith solvent-applying and drying means that will automatically treat and prepare the transfer member for the next printing operation as it is driven between the stations.

It is a still further object of the invention to provide in a silk-screen ceramic printing machine wherein the silk screen is mounted over the ink transfer member so that it can be readily lifted therefrom and access easily had to the top surface of the transfer member and to the silk-screen for any cleaning thereof that may be needed.

It is a still further object of the invention to provide in a silk-screen ceramic printing machine an automatically timed fluid operating means serving to in sequence elevate the holder for the dish or article tightly against the transfer member and expand the ink transfer member into the dish to print it.

It is a still further object of the invention to provide in a silk screen printing machine for ceramic articles means connected between the ceramic article holder device and the ink transfer member by which intermittent movement of the transfer member is effected by the outward movement of the ceramic article holder.

Still further objects of the invention are to provide an automatic silk-screen ceramic printing machine which is of simple construction, easy to operate, gives an improved quality of decoration, increases several times the production of hand machines, eliminates fatigue of the operator, adapted for operation by a single operator, easy to be maintained and may be kept in running condition by the operator herself, curtails breakage, consumes minimum space, conserves printing ink and pigments, effective and efficient in use.

For still further objects and for a better understanding of the invention, reference may be had to the following detailed description taken in connection with the accompanying drawing, in which—

Figure 2:
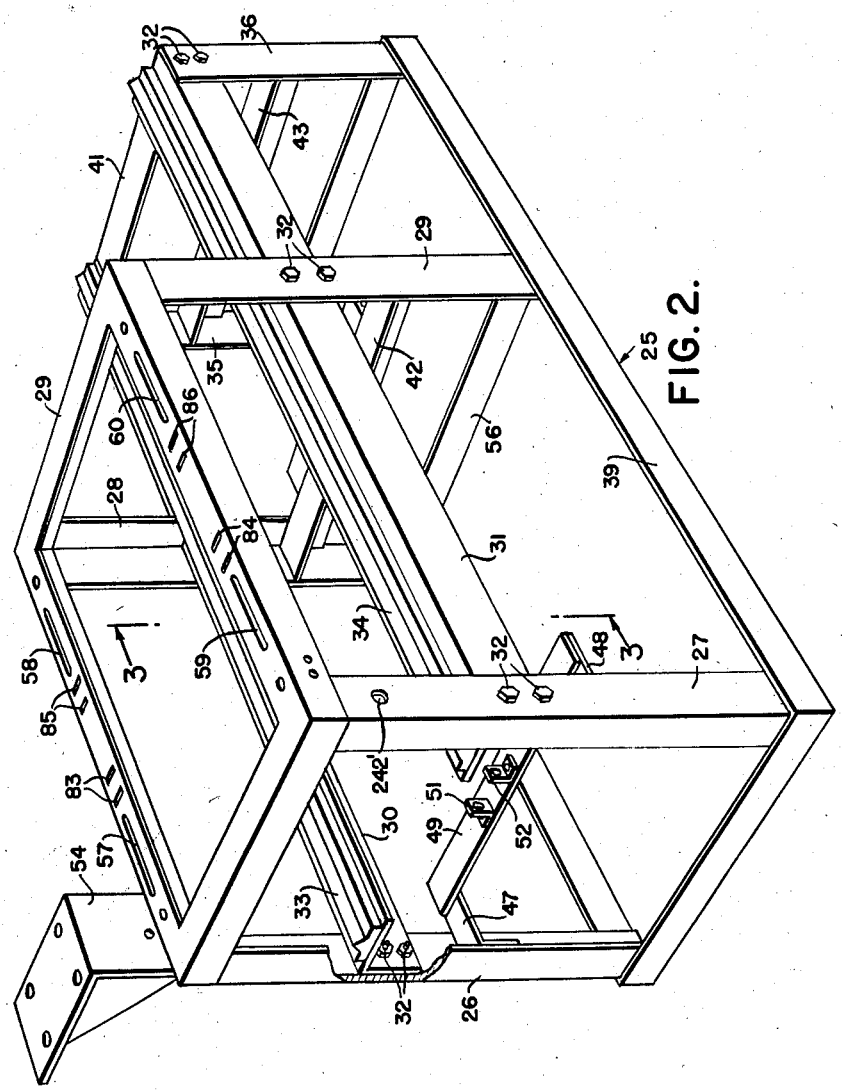
Figure 3:
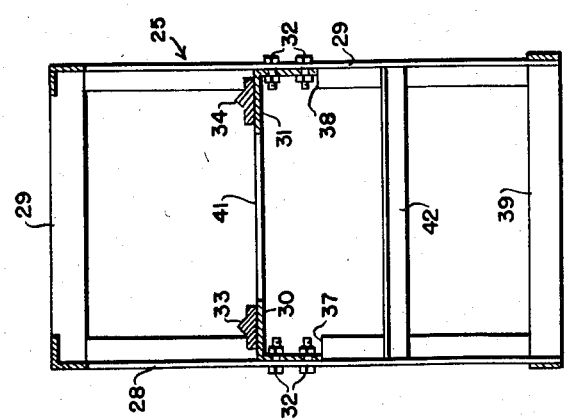
Figures 4, 5:
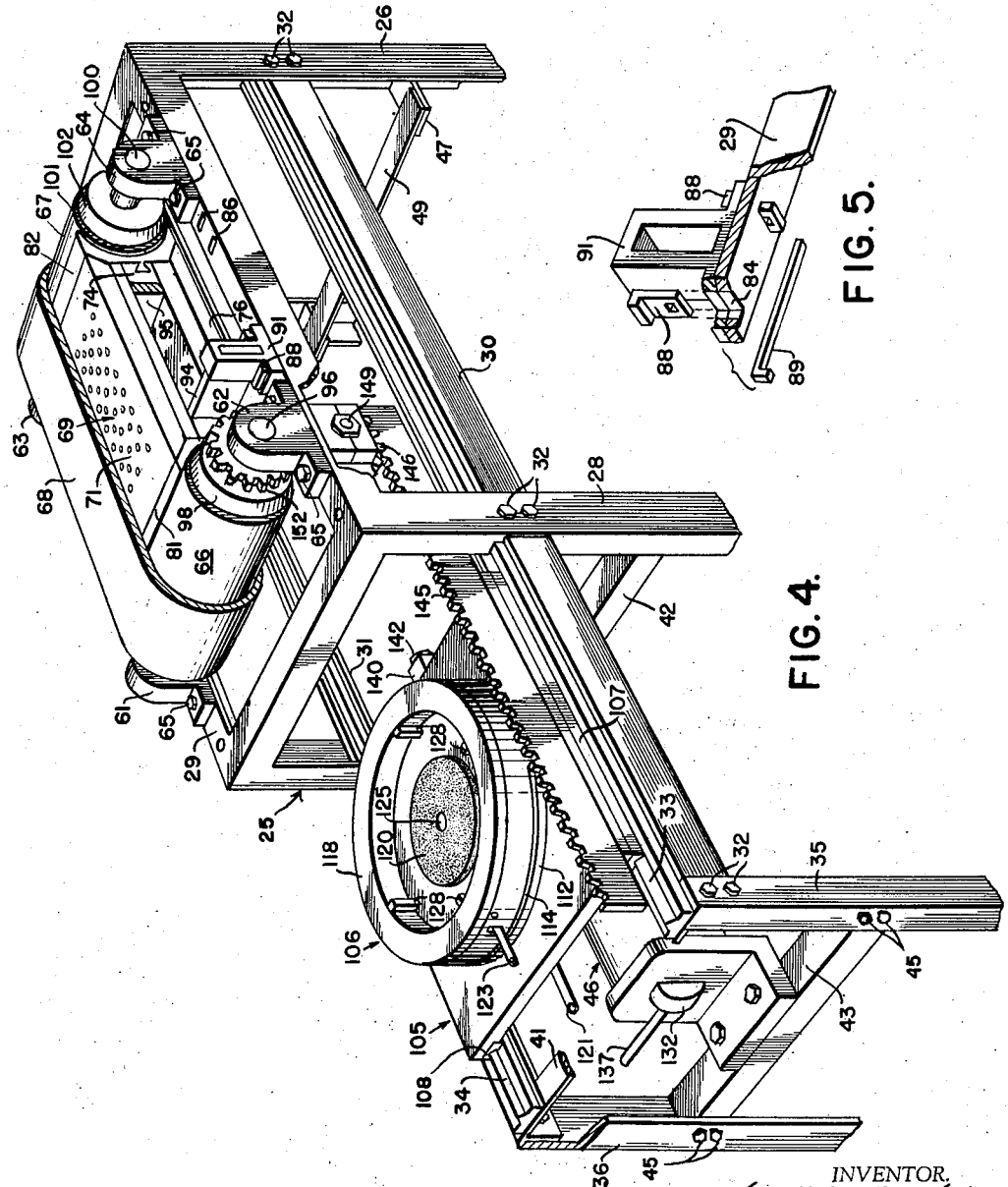
Figure 9:
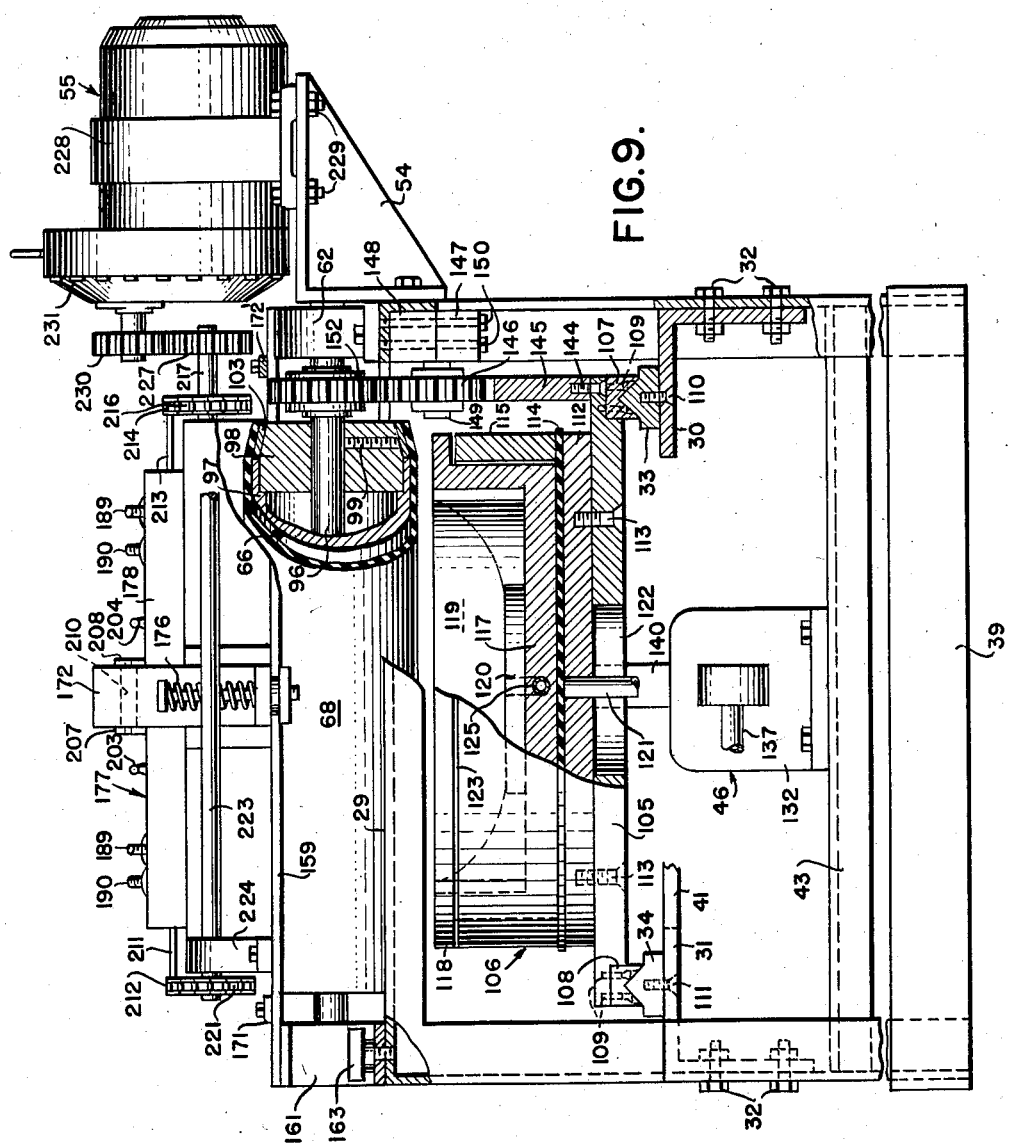
Figure 10:
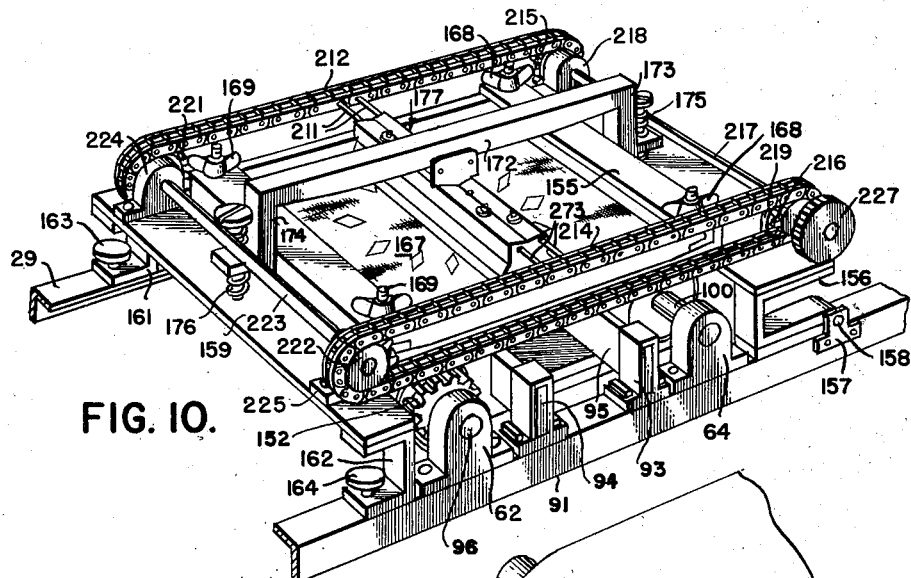
Figures 11, 12:
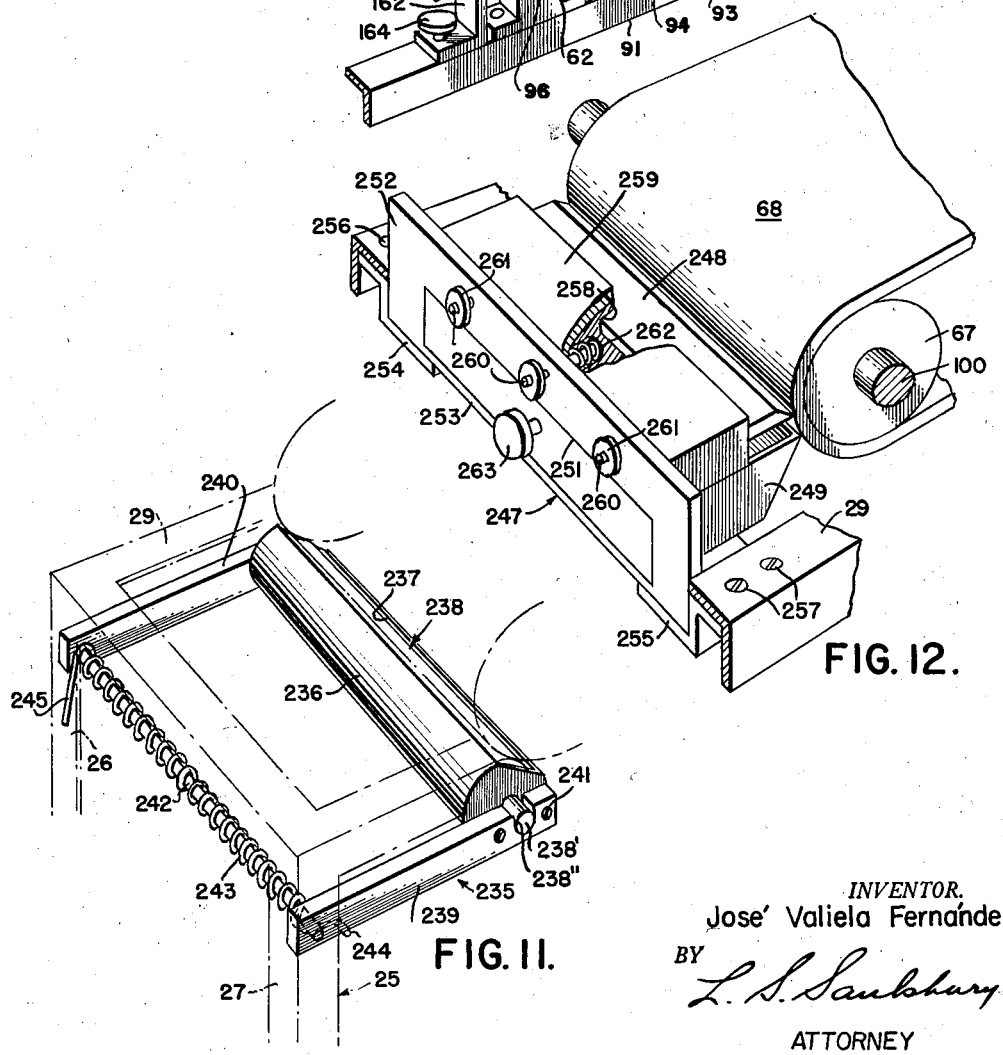
Figure 13:
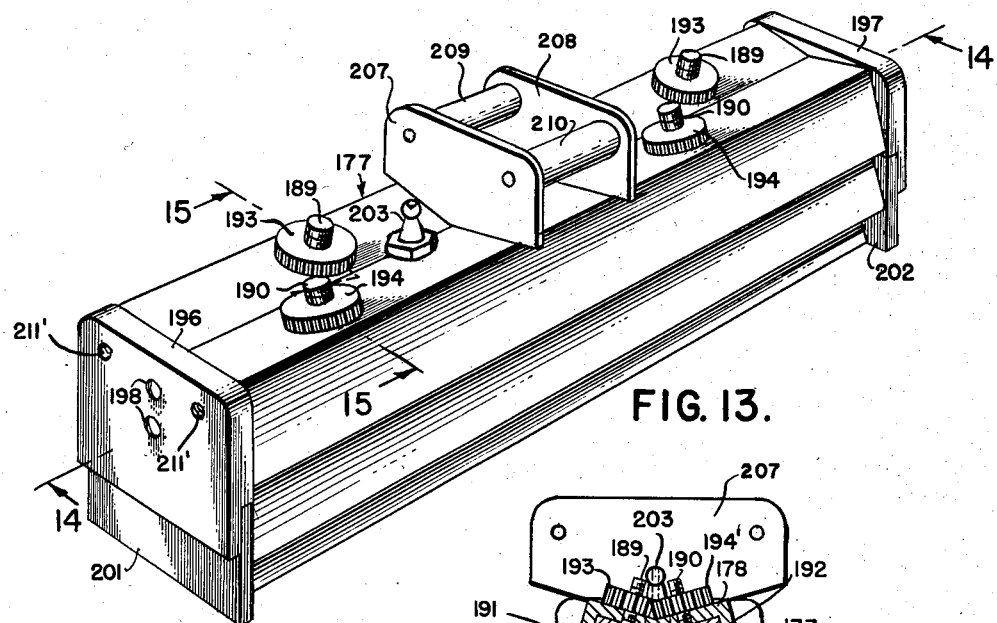
Figure 15:
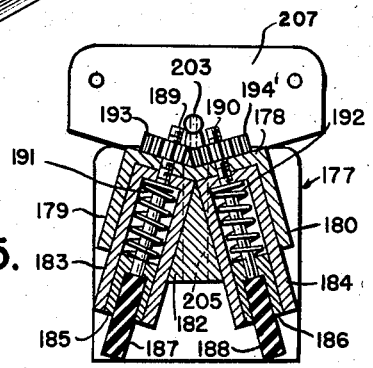
Figure 14:
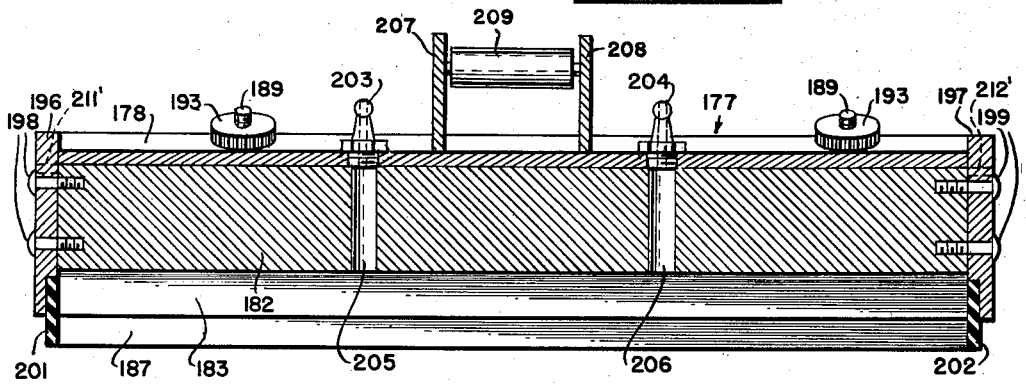

Figure 1 is a fragmentary side elevational view of the automatic silk-screen ceramic printing machine embodying the features of the present invention, Fig. 2 is a perspective view of the supporting frame structure stripped of the operating mechanism, Fig. 3 is a vertical sectional view of the supporting frame structure taken on line 3—3 of Fig. 2, Fig. 4 is a fragmentary perspective view of the machine with the squeegee device removed therefrom and the belt transfer member broken away to show the rollers and intermediate support, Fig. 5 is an enlarged fragmentary perspective view showing the bracket and its parts for detachably mounting the intermediate transfer member support on the top of the supporting frame structure, Fig. 6 is a top plan view of the ceramic printing machine with the ceramic article holder withdrawn and at the loading and unloading position, Fig. 7 is an enlarged fragmentary and longitudinal sectional view taken generally on line 7—7 of Fig. 6 but with the ceramic article holder lying under the transfer member and unelevated, Fig. 8 is a fragmentary longitudinal sectional view similar to Fig. 7 but with the article holder elevated to clamp the transfer member against its support and the member expanded into the dish to print it, Fig. 9 is an end elevational view of the machine looking upon the article carrier with portions thereof and the ink transfer member broken away to show the interior construction of the machine, Fig. 10 is a fragmentary perspective view of the top of the machine and of squeegee device, Fig. 11 is a perspective view of the solvent-applying means for the belt transfer member, Fig. 12 is a perspective view of the belt transfer wiper, Fig. 13 is a perspective view of the silk-screen squeegee device, Fig. 14 is a longitudinal sectional view of the squeegee taken on line 14—14 of Fig. 13, Fig. 15 is a transverse sectional view of the squeegee taken on line 15—15 of Fig. 13, and Fig. 16 is a diagrammatic view of the operating parts of the machine including the cylinder device, rack and slip clutch drive for the transfer belt, air control valves, the starting foot control for the cylinder device and vacuum lines.

Referring now particularly to Figs. 1, 2 and 3, 25 represents generally the frame on which the various operating parts are mounted. This frame 25 includes leg members 26, 27, 28 and 29 on angle section rectangularly arranged and joined at the top by a welded top frame 29 that are formed of angle section members and welded to the upper ends of the leg members. Secured to the opposite sides of the supporting frame and running respectively between the upright members 26, 28 and 27, 29 are respective guide rail supports 30 and 31 of angle section. These guide rail supports are secured to the legs by bolts 32. Respectively mounted upon these supports 30 and 31 are respective support guide rails 33 and 34 and with the guide rail supports 30 and 31 extend forwardly beyond the legs 28 and 29. The forward ends of the guide rail supports are respectively secured to short legs 35 and 36 by bolts 32. The legs 28 and 29 are cut away respectively at 37 and 38 to allow the guide rail supports 30 and 31 to pass therethrough. A bottom frame 39 extends around the lower ends of the legs to stiffen the supporting frame thereat.

On the front end of the frame 25 at the elevation of the guide rail support 30 and 31 is a transverse frame member 41 serving to tie the guide rail supports and front legs together. Between the legs 28, 29 and 35, 36 are respectively transverse members 42 and 43. They are secured thereto by bolts 44 and 45 and serve to support a power cylinder device 46. On the respective legs 26 and 27 are respective angle brackets 47 and 48 that extend forwardly therefrom. A transverse member 49 is connected between the brackets 47 and 48. Opposing lugs 51 and 52 are mounted on the transverse member 49 and serve to support an operating valve 53 Not only do the transverse members 42, 43 and 49 support the cylinder device 46 and the operating valve 53 but serve to transversely stiffen the supporting frame. A transverse stiffening member 56 is connected between the lower ends of the legs 28 and 29. A bracket 54 is secured to the right side of the top frame to support a squeegee operating motor 55. All parts of the frame are connected together by welding except where bolts have been mentioned.

On the respective opposite sides of th top frame 29, there are respectively provided elongated slots 57, 58, and 59, 60. These slots are made sufficiently long so that roller bearing brackets 61, 62 overlying respective slots 57 and 59 and bearing brackets 63, 64 overlying respective slots 58, 60 can be longitudinally adjusted with their respective securing blots 65 along the frame so as to permit ink transfer belt rollers 66 and 67, respectively carried by brackets 61, 62, and 63, 64, to be moved in order that ink transfer belt 68 may be tightened or can be loosened at times when the belt 68 is to be removed from the machine.

Interposed between the rollers 66 and 67, Figs. 4 and 7, is a hollow transfer belt supporting structure 69 adapted to retain the belt on its top and bottom sides in a flat manner. The transfer belt supporting structure comprises a hollow top assembly formed of a plate 70 and a top perforated plate 71 with a vacuum chamber 72 disposed therebetween, vertical spacing members 73, 74 and a bottom hollow assembly formed of a plate 75 and a perforated plate 76 with a pressure chamber 77 disposed therebetween. These top and the bottom assemblies are joined to one another through the spacing members 73 and 74 by long bolts 78 and 79. The spacing members 73 and 74 respectively have dove-tail grooves 73' and 74' in which are slidably fitted dovetail projections of concave transverse end pieces 81 and 82 having close tolerance with the inner sides of the rollers 66 and 67. These transverse end pieces 81 and 82 are laterally removable from the assemblies to allow the rollers to be contracted and at times when the transfer belt 68 needs to be removed.

Disposed inwardly of the respective elongated slots 57, 59 of the top frame 29 are respectively parallel transverse slots 83, 84 and inwardly of elongated slots 58, 60 are parallel transverse slots 85, 86. Overlying the slots 83 is a mounting bar supporting bracket 87 that is removably retained by plug pins 88 that extend through the slots 83 and made secure to the underside of the frame 29 by a locking pin 89, Fig. 5. Similarly connected over the slots 84, 85, 86 are respective mounting bar supporting brackets 91, 92 and 93. Running through the hollow belt transfer supporting structure between the upper and lower assemblies thereof are mounting bars 94 and 95 lying respectively next to spacing bars 73 and 74. The mounting bar 94 is supported in brackets 87 and 91 while the mounting bar 95 is supported in mounting bar supporting brackets 92 and 93.

The mounting bar supporting brackets on either side of the top frame 29 can be easily removed along with the roller bearing brackets on one side of the machine and the concave transverse pieces 81 and 82 so that the ink transfer belt 68 can be removed completely free from the rollers.

The transfer belt roller 66 has a central drive shaft 96, tapered end members 98 secured to the shaft by set screws 99 and a sleeve 97 shouldered to the tapered end members 98, Fig. 9. The idler transfer belt roller 67 is similarly constructed and has a central shaft 100, that is journaled in bearing brackets 63 and 64, a sleeve 101 and tapered end members 102, Fig. 4. The ink transfer belt 68 has adhered to the inner face along each edge, a flexible non-elastic narrow drive belt 103, Fig. 9, that run over the tapered faces of the tapered end members 98 and 102 and which serve as the driving medium for the belt 68. The transfer belt 68 is molded out of plastic material and is elastic.

A carrier plate 105 supports an article holder or dish centering device 106 and has guide way members 107 and 108 slidable respectively along guide rails 33 and 34, Fig. 9. These guide way members 107 and 108 respectively are secured under the sides edges of the carrier plate 105 by fastening screws 109. The guide way members 107 and 108 have a V-shaped groove to accommodate the corresponding V-shaped top edge of the guide rails 33 and 34. The guide rails are secured respectively to the guide rail supports 30 and 31 by respective fastening screws 110 and 111.

The article holder or centering device has a circular bottom plate 112 which is secured to the carrier plate 105 by fastening screws 113, Fig. 9. Overlying this bottom plate 112 is a flexible diaphragm 114 over which lies a retaining ring 115 that surrounds the periphery of the flexible member or diaphragm 114 and is secured to the bottom plate 112 by fastening screws 116, Fig. 7.

Adapted to be fitted into the ring 115 is a dish holder part 117 having a top flange 118 adapted to overlie the upper edge of the ring 115 and which is recessed to receive a ceramic dish bisque 119. Upon the bottom of the dish holder part, is a cushion plate 120 on which the dish bisque is rested. The bottom face of the holder part 117 rests upon the diaphragm 114 and is lifted thereby when air under pressure is delivered through a pipe 121 that extends upwardly through a large hole 122 in the carrier plate 105 and through the bottom plate 112 to the underside of the diaphragm 114. As the pressure is applied the diaphragm 114 and the article holder is elevated with the dish bisque so that the flange 118 thereof engages with the transfer belt 68 and clamps it against the underside of the belt supporting structure 69 and over the bottom perforated plate 76 thereof in the manner as best illustrated in Fig. 8. While this operation is being effected the dish bisque 119 is held upon the cushion plate 120 by creating a vacuum within the holder and under the dish bisque from a vacuum pipe 123 and passage 124 extending from the outer periphery of the holder part 117 to the center thereof and in registry with the center hole 125 in the cushion pad 120. The ring 115 has a slot 126 through which the pipe 123 extends. This slot 126 is vertically elongated to permit this vertical movement of the pipe 123 as the holder 117 is elevated.

After the transfer belt 68 has been clamped against the bottom perforated plate 76, air under pressure is applied to the transfer belt 68 through the perforated plate 76 from the chamber 77 whereby to force the belt into the dish bisque 119 as illustrated in Fig. 8 to transfer the inked design onto the dish bisque 119. Air is supplied to the transfer belt supporting structure and chamber 77 by a pipe 127. The dish bisque 119 will accordingly be forced downwardly upon the cushion pad 120 and its upper edge will be forced against vertically-extending cushion rod members 128 angularly spaced about the inner wall of the holder part 117 and which are resilient so as to break the vacuum and release the dish bisque 119, when the air pressure has been removed, and the printed dish bisque made ready so that it can readily be removed from the holder and the holder made ready for receiving the next dish bisque to be printed.

The cylinder device 46 is two way and has a cylinder 130 and cylinder heads 131 and 132 that are respectively secured to the respective transfer supports 42 and 43 by fastening bolts 134 and 135, Fig. 1. The cylinder head 131 has an air supply pipe 136 for delivering air to that end of the cylinder device 46 and the head 132 has an air supply pipe 137 for delivering air to that end of the cylinder. Slidable within the cylinder is a piston 138 to which a piston rod 139 is attached and which is slidable through the head 131. The outer end of the piston rod 139 is threaded and has an upright connecting member 140 thereto by means of lock nuts 141. The upright member is connected by a fastening screw 142 to the rear edge of the carrier plate 105, Fig. 7.

As the cylinder device 46 is operated carrier plate will be moved with the dish holder or centering device 106 to a printing position within the machine under the belt 68 and returned to its starting position after the printing has been effected upon the dish bisque. The system for supplying air to the cylinder device 46 will be later described.

Secured to the right edge of the carrier plate 105 by means of fastening screws 144 is a longitudinally-extending rack 145. This rack operates an idler gear 146 disposed thereabove and journalled on a stub shaft 149 fixed to the underside of the top frame 29 by clamp part 147, 148 and long bolts 150, Fig. 9.

On the roller shaft 96 is fixed a gear 152 that meshes with the idler gear 146 and which has a one-way clutch assembly 153 therein to permit the transfer belt 68 to be undriven on the forward movement of the centering device 106 and its carrier 105 into the machine but operable upon the return movement of the centering device 106 to advance the transfer belt 68 and position the printed impression thereon in readiness for printing upon the next dish that is moved into the machine.

Extending transversely across the top frame 29 in front of the roller 66 is an elevated silk screen support member 155 of Z-section to the underside of which and at the opposite ends of which are connected respectively hinge brackets 156 that are secured to a fixed hinge assembly 157 by a pin 158 on the respective opposite sides of the top frame 29. Extending transversely across the frame 29 in rear of the belt roller 67 is a parallel elevated silk screen transverse support member 159 of Z-section to the opposite ends of which there depends bracket supports 161 and 162 that are respectively releasably secured to the top frame 29 by respective hand screws 163 and 164.

A silk screen frame 166 having a screen 167 is secured between the transverse members 155 and 159 by thumb nut assemblies 168 and 159 as best viewed in Fig. 7. These transverse members 155 and 159 when taken with the screen frame 166 provide a relatively rigid assembly but in order to maintain the connection of the transverse members 155 and 159 to one another at times which the screen frame 166 is removed, the transverse members 155 and 159 are connected together by longitudinally-extending runners 171 and 172', Fig. 6. It will thus be seen that this assembly can be hinged upwardly as illustrated in Fig. 7 upon the hinge pins 158 in order to provide access to the upper surface of the transfer belt 68 and at times when the screen 167 is to be removed.

Overlying the center of this assembly is an elevated pressure bar 172 having depending ends 173 and 174 respectively connected to the respective transverse Z-members 155 and 159 by balance spring bolt assemblies 175 and 176. This pressure bar 172 serves as a means against which a squeegee assembly 177 may react so that sufficient wiping pressure will be maintained against the screen material 167 when forcing ink or pigment thereinto. The balance spring bolt assemblies 175 and 176 can both be adjusted to vary the amount of the squeegee pressure upon the screen 167.

The squeegee assembly structure 177 comprises a transversely-extending inverted channel body 178 having outwardly-inclined depending sides 179 and 180. Extending centrally through the transverse member 178 and having its inclined sides running parallel to and respectively spaced from the depending sides 179 and 180 is a central guide support 182 of triangular section. Extending through the spaces between the central member 180 and the respective side portions 179 and 180 are respectively inverted guide channel members 183 and 184 adapted to slidably contain internal channel blocks 185 and 186 to which soft flexible squeegee elements 187 and 188 are respectively secured. The inner channel blocks 185 and 186 are respectively held against downward displacement by threaded rods 189 on one side of the body 178 and by threaded rods 190 on the other side of the body 178. Springs 191 and 192 are respectively disposed upon the rods 189 and 190 and react between the outer and inner channels to force the inner channel blocks and its squeegee elements downwardly toward and upon the silk screen material 167 to maintain the pigment material between the squeegee elements 187 and 188 and keep it from building up. By turning hand nuts 193 or 194 on the rods 189 or 190 the amount of pressure of the squeegee elements 187 and 190 upon the silk screen 167 can be adjusted.

At the opposite ends of the body 178 are respective end closure plates 196 and 197 which are connected thereto and to the central guide support 182 by screws 198 and 199. The respective plates 196 are recessed along their lower edges and secured within these recesses by adhesive are respective soft flexible rubber end closure elements 201 and 202 which serve to maintain the ink or pigment material within the squeegee structure against displacement from the ends thereof. The end members 201 and 202 span and bear against the ends of the squeegee elements 187 and 188 so as to provide a completely enclosed ink or pigment chamber thereby to prohibit the ink from leaving the squeegee structure except through the silk screen material into which it is wiped upon longitudinal movement of the squeegee structure over the silk screen under the pressure bar 172.

The squeegee structure 177 is supplied with the pigment by a pressure gun applied to respective nipples 203 and 204 that are respectively aligned with vertically-extending holes 205 and 206 in the guide support 182.

In order to provide a frictionless engagement of the squeegee structure 177 with the underside of the pressure bar 172, parallel spaced bars 207 and 208 are welded to the top surface of the squeegee body 178 and longitudinally-spaced rollers 209 and 210 are respectively journalled therein. These rollers engage with the undersurface of the pressure bar 172. Extending respectively from holes 211' and 212' end plates 196 and 197 are respective spaced rods 211 and 212 which are respectively secured to squeegee driving sprocket chains 212 and 214. At the rear of the machine the sprocket chains 212 and 214 respectively run over drive sprockets 215 and 216 supported on respective opposite ends of a drive shaft 217 that is journalled and spaced bearings 218 and 219 mounted on the rear silk screen support members 155, Fig. 10. The opposite end of the sprocket chains 212 and 214 are run over idler sprockets 221 and 222 at respective opposite ends of a shaft 223 journalled in spaced bearings 224 and 225 mounted on the front transverse silk screen support member 159.

The shaft 217 has a gear 227 on its end adjacent electric motor 55. Electric motor 55 is clamped to motor supporting bracket 54 by a strap clamp 228 and fastening bolts 229, Fig. 9. When the screen and the squeegee are lowered to the working position and secured to the top frame 29, the sprocket drive gear 227 is moved upwardly into engagement with a gear 230 extending from a reduction gear box 231 of the motor 55. The motor has a cable box 232 through which current is supplied for the operation of the motor. The motor 55 is reversible and is automatically controlled as hereinafter described to rotate the motor pinion shaft first in one direction and then in the other to make intermittent opposite passes of the squeegee assembly 177 over the silk screen 166 first in one direction and then in the other to make the impression upon the transfer belt 68. While this is being done the transfer belt is held against the perforated plate 71 by vacuum pressure provided in the chamber 72 by a vacuum pipe line 233.

In order that the transfer belt 68 will be cleaned and the ink removed after each use thereof a solvent-containing roller device 235 is provided, Figs. 7 and 11. This solvent device 235 is mounted inside of the rear end of the supporting frame 25 just below the top frame 29 thereof and is extended to the underside of the transfer belt 68 and against belt roller 66. This device has a trough 236 having an elongated inclined top opening 237 and a dip roller 238. The ends of the trough are secured to the outer ends of spaced supporting arms 239 and 240 by fastening screws 241. Trunnion ends 238' of the roller 238 extend through the ends of the trough and are respectively nested and journalled in notches 238" in the supporting arms 239 and 240. The inner ends of the supporting arms 239 and 240 are fixed to a shaft 242, the ends of which are pivoted in holes 242' in the respective frame legs 26 and 27. A tensioned coil spring 243 surrounds the shaft and one end 244 is connected to the underside of the supporting arm 239 while its other end 245 is anchored against frame leg 26. The wetted roller 237 is thus maintained tight in rolling contact with the underside of the transfer belt 68 to provide solvent thereto.

After the transfer belt 68 has been treated with the solvent the belt is wiped dry with a wiping device 247. This device 247 has a firm wiping element 248 that scrapes or wipes the belt surface.

The wiping element 248 engages the belt 68 intermediate the height of the roller. Under the wiping element 248 is a trough 249 adapted to catch the drippings wiped off the belt 68 by the wiping element 248. This trough 249 is slidable through an elongated opening 251 in a vertically-extending supporting plate 252 that has its bottom edge welded to spaced mounting brackets 254 and 255 that are secured respectively by fastening screws 256 and 257 to the opposite undersides of the top frame 29.

The wiping element 248 is retained in channel block 258 which is slidable in a guide member 259. Threaded rods 260 extend rearwardly from the guide member through the closed back portion of the guide member and the vertically-extending supporting plate 252 and are secured thereto by adjusting knobs 261. Surrounding the rods 260 and within the guide member 259 are pressure springs 262 which bear rearwardly against the back portion of the guide member and forwardly against the channel block 258 to supply the contact pressure of the wiping element upon the transfer belt 68. By turning the adjusting knobs 261 this pressure can be varied.

In operation, a dish bisque 119 to be printed is placed in the centering device 106 by the operator or by automatic dish handling device located adjacent to the machine. A foot lever 265 of a four-way air valve is depressed by the operator against the action of its return spring 267, Fig. 16. Air under pressure is supplied by pipe line 268 to the foot valve 266 at a selected pressure as determined by the pressure regulator 269. As the lever 265 is depressed, the air is delivered through the pipe line 137 to cylinder head 132 of the cylinder device 46 thereby to cause the piston 138 and rod 139 to move the carrier 105 and the centering device 106 along the guide tracks 33 and 34 into the main part of the machine and under the ink transfer belt 68. The speed at which the centering device 106 moves into the machine will be determined by the adjustment of a speed control valve 271. Air from the opposite end of the cylinder device 46 will be exhausted through the foot valve 266 and exhaust pipe 272 leading therefrom.

The carrier plate 105 has a trip roller 273 adapted to ride over and depress a lever 274 on the three-way trip valve 53. Air under pressure from supply pipe line 275 is admitted to the valve 53. The pressure of this air is determined by the setting of the pressure regulator 276 in pipe line 275. Air under pressure is then delivered through a pipe 277 to a three-way pilot timer valve 278 that can be adjusted by its adjusting screw 279 to any desired amount of time such as from one to three seconds depending upon the depth of the article being printed.

Air is delivered for this period to a pipe line 280 and branch pipe lines 127 and 121 having respectively adjustable speed control valves 281 and 282 therein. The control valve 281 in the pipe line 121 is set to a pressure from ten pounds to twenty pounds per square inch and at a greater pressure than that which the control valve 282 is set in pipe line 127. This control valve 282 is correspondingly set to a pressure from five pounds to fifteen pounds per square inch.

Because of the greater pressure in the pipe line 121 than in the pipe line 127 the recessed article holder part 117 with the dish bisque 119 is elevated in advance of the depressing of the ink transfer belt 68 into the dish to effect a printing operation and permits secure clamping of the belt against the belt supporting structure 69 prior to the delivery of pressure to the chamber 77 and the forcing of the transfer belt 68 into the dish bisque 119 to make the decorative impression thereon.

Vacuum line 123 remains normally on during this time to maintain the dish bisque 119 in place upon the cushion pad 120. The carrier 105 will be returned upon release of the foot lever 265, and the air pressure delivered to the cylinder device 46 through the pipe line 136 and cylinder head 131, at a speed determined by speed control valve 272 in line 131. A vacuum control valve 283 will be engaged by the carrier 105 to break the vacuum under the printed dish bisque 119 and to thereby permit the release of the dish bisque from the cushion pad 120 and its elevation by the resilient pieces 128. The printed dish bisque on the return centering device 106 can be easily taken therefrom.

At the same time that the carrier is returned the ink transfer belt 68 is automatically advanced with a new imprint, by the rack 145, gears, 146, 152 and one-way clutch 153 and the unused ink on the belt 68 is automatically removed by the solvent-applying device 235 and the wiper device 247. The supply of air pressure to the belt through the timer valve 278 would have been terminated so that the belt 68 would have been released.

Also, at this same time a timed-controlled reversing electric motor switch 286 has its lever 287 engaged by some part of carrier 105 and rotated to cause the electric motor to be driven in one direction and the squeegee 177 moved with one pass across the silk screen 167. This switch is connected by cable wires 288 to the electric motor cable receptacle 232. On the next printing cycle the motor control switch is rotated and stepped to the next circuit position to cause the motor to rotate in the opposite direction and the squeegee 177 moved one pass across the silk screen in the opposite direction. The belt 68 is thus cleaned and printed when the printed dish bisque has been withdrawn from the printing station under the belt 68. Not only is the vacuum valve 283 depressed to release the dish bisque 119 but a vacuum valve 284 is opened to create a vacuum in line 285 and chamber 72 in the belt supporting structure 69 to hold the top of the belt 68 against the perforated plate 71 while the impression is being made upon the belt by the silk screen 166 and the squeegee 177.

While the foot valve is operated to start the movement of the centering device into the machine and the return of the centering device being effected by release of the foot valve, it shall be understood that an automatic time control can be incorporated in the air system to cause the automatic reversal of the movement of the centering device after a predetermined time regardless of whether or not the foot is maintained upon the foot valve. It shall also be apparent that such air control arrangement may be such as to work in cooperation with an automatic feeding mechanism for delivery and removal of dish bisque to or from the centering device.

It should now be understood that there has been provided an automatic silk-screen ceramic printing machine for printing and decorating concave and convex surfaces of ceramic articles and in which all operations preparatory to the printing of the dish bisque are all automatic even to the cleaning of the ink transfer belt with solvent and the operation of the squeegee across the silk screen. These latter operations are all done as the printed bisque is removed from the machine and prior to the placing into the machine the next dish bisque to be printed. It should also be apparent that the machine can be operated by a single operator with little effort and given little opportunity for breakage.

While various changes may be made in the detailed construction, it shall be understood that such changes shall be within the spirit and scope of the present invention as defined by the appended claims.

What is claimed is:

1. An automatic silk-screen ceramic printing machine comprising a supporting structure having a top frame and guide rail members thereunder, a centering device and carrier slidable upon said guide rail members between starting and printing positions, an ink transfer belt supporting structure mounted on the top frame, belt supporting rollers lying on opposite ends of said belt supporting structure, an ink transfer belt movable over the rollers and the transfer belt supporting structure, said centering device adapted to underlie the transfer belt when in the printing position, a silk screen mounted on the top frame and overlying the top of the transfer belt, a squeegee assembly operable over the silk screen to force ink through the silk screen to impress the transfer belt on its top side with a pattern, air pressure means operable upon the bottom side of said belt to force the belt into the centering device and to print the ceramic article contained therein, and automatic power means for effecting in sequence the movement of the centering device into the machine, the forcing of the belt upon the ceramic article, the return of the centering device to its starting position, the advancement of the transfer belt and the driving of the squeegee over the silk screen to prepare the belt for another printing cycle.

2. An automatic silk screen ceramic printing machine as defined in claim 1, said centering device having a vertically-liftable article holder part with a peripheral flange, a lifting device for effecting the elevation of the holder part and its flange into clamping engagement of the transfer belt with the underside of the belt supporting structure to hold the belt while being forced into the article to effect the printing operation thereof.

3. An automatic silk screen ceramic printing machine as defined in claim 2, and said lifting device being air-operated, said power means further including an air-operated device for forcing the transfer belt upon the ceramic article and automatic air supply control arrangement for causing first the operation of the lifting device to clamp the article holder and thereafter the printing operation of the transfer belt.

4. An automatic silk screen ceramic printing machine as defined in claim 1, and said power means including a one-way intermittently operable device extending between the carrier and one of the rollers of the transfer belt to advance the belt in response to one movement of the centering device and its carrier.

5. An automatic silk screen ceramic printing machine as defined in claim 1, a vacuum line arrangement extending to the centering device and operable upon the article lying within the centering device to maintain it against movement while being printed upon and to the top part of the transfer belt upon the transfer belt supporting structure to hold the transfer belt thereupon while being impressed with the pattern from the silk screen and operable to effect in response to the movement of the centering device and its carrier the release of the vacuum that retains the article and the vacuum that retains the belt.

6. An automatic silk screen ceramic printing machine as defined in claim 5, said power means including the drive for the squeegee assembly and a control means also effective upon the return movement of the centering device and its carrier and while the belt is being retained upon the top of its supporting structure by vacuum.

7. An automatic silk screen ceramic printing machine as defined in claim 6, and a releasable frame overlying said belt and hingeably connected to said top frame, said silk screen mounted on said releasable frame, said squeegee assembly having a drive mechanism mounted on said frame to move the squeegee over the silk screen, said drive mechanism having a drive gear, a motor mounted on said supporting frame and having a gear adapted to engage said squeegee drive mechanism, said gears being disengaged from one another upon the frame being hinged upwardly from the top frame whereby access can be readily had to the screen and to the top of the belt by lifting the hingeable frame.

8. An automatic silk screen ceramic printing machine as defined in claim 7, and a pressure applying bar adjustably mounted on said hingeable frame and running longitudinally thereof, anti-friction means on said squeegee assembly engageable with the underside of said pressure bar, whereby said squeegee may be retained in tight engagement with the top surface of the silk screen while being drawn thereover.

9. An automatic silk screen ceramic printing machine as defined in claim 1, and bracket means for releasably securing said transfer belt supporting structure and said rollers upon the top frame whereby said transfer belt may be readily removed from said rollers.

10. An automatic silk screen ceramic printing machine as defined in claim 1, and said transfer belt supporting structure comprising upper and lower hollow assemblies with respective top and bottom perforated plates, spacing members disposed between the upper and lower assemblies, concaved end members laterally removable from said spacing members, said belt rollers operable in the concaved end members, bracket means for releasably securing said rollers upon said frame to permit longitudinal adjustment of the rollers along the frame, whereby upon said end members being removed contraction of the belt may be permitted for its easy engagement with or removal from the rollers.

11. An automatic silk screen ceramic printing machine as defined in claim 10, and mounting bars extending laterally through the belt supporting structure and adjacent to the respective spacing members, mounting brackets for retaining the opposite ends of said mounting bars and means for releasably securing said brackets to said top frame.

12. An automatic silk screen ceramic printing machine as defined in claim 1, said centering device comprising a bottom plate, a flexible membrane overlying the bottom plate and adapted to be expanded upwardly therefrom, a ring surrounding the bottom plate and overlying the lifting membrane to peripherally secure the same to the bottom plate, and an article holder part having a peripheral top flange removably retained within said ring, and a cushion pad upon the bottom of said holder part upon which the article is rested.

13. An automatic silk screen ceramic printing machine as defined in claim 12, and vacuum line means extending through the holder part and the cushioning pad to hold the article upon the pad, and angularly-spaced resilient members adapted to receive the edge of the article, and adapted upon release of the vacuum to eject the article from the holder part.

14. An automatic silk screen ceramic printing machine as defined in claim 1, and said power means including a rack extending longitudinally of and mounted upon one side of the centering device carrier, an idler gear journalled on said supporting frame and operable by said rack, a one-way clutch gear secured to one of the rollers and engaging with said idler gear to be operated thereby whereby with one movement of the carrier said ink belt will remain stationary while with the other movement of the carrier said ink transfer belt may be advanced.

15. An automatic silk screen ceramic printing machine as defined in claim 1, and a solvent applying device engageable with the underside of said belt rearwardly of the printing station of the centering device to apply solvent upon the ink transfer belt and a wiping device mounted on said supporting frame and engageable with the belt to remove the solvent therefrom and dry the belt preparatory to the making of the next impression thereon.

16. An automatic silk screen ceramic printing machine as defined in claim 1, and said squeegee assembly comprising a transversely-extending body having downwardly and outwardly inclined sides, a center guide member extending therethrough, guide channels mounted between the center member and the depending sides, squeegee elements slidably mounted in said guide channels, and providing an internal space therebetween within the squeegee assembly for receiving the supply of ink material, pressure fittings on said transversely-extending body through which ink material may be supplied to the internal space therein, and spring pressure devices operable between the body and the squeegee elements for varying the pressure of the squeegee elements upon the silk screen.

17. A squeegee assembly for use in distributing ink material over silk-screens comprising an inverted hollow channel body having outwardly inclined depending sides, a central guide member running through said hollow channel body centrally thereof and providing guide faces parallel to said depending side portions, guide members mounted between the central member and the depending side portions, wiper elements and retaining blocks therefor slidable within the channel members, threaded rods extending upwardly from the wiper blocks and through the top of said inverted hollow body member, pressure springs surrounding said rods and reacting between the channel members and the blocks to urge the wiping elements upon the silk screen, adjusting nuts overlying the upper face of the inverted channel body and adjustable upon said threaded rods to vary the wiping pressure of the wiping elements, and end closure members secured to said central guide member and soft flexible end plates carried by the respective end members and overlying the ends of the wiper elements, and pressure fitting passage way means extending through the inverted channel body and the central guide member into the space below and between the wiping elements.

No references cited.